US006691063B1

(12) United States Patent
Campbell et al.

(10) Patent No.: US 6,691,063 B1
(45) Date of Patent: Feb. 10, 2004

(54) MEASURING A BASEBALL PLAYER'S ACCUMULATED WINNING CONTRIBUTION

(76) Inventors: Derek H. Campbell, 541 Noble, Chicago, IL (US) 60622-6669; Colin K. Campbell, 109 Lewis Brook Rd., Pennington, NJ (US) 08534; Ronald J. Campbell, 109 Lewis Brook Rd., Pennington, NJ (US) 08534

( * ) Notice: Subject to any disclaimer, the term of this patent is extended or adjusted under 35 U.S.C. 154(b) by 131 days.

(21) Appl. No.: 10/098,245

(22) Filed: Mar. 16, 2002

(51) Int. Cl.[7] ................................................ G06F 19/00
(52) U.S. Cl. ........................................ 702/182; 702/181
(58) Field of Search ............................ 273/118 R, 244, 273/244.2, 277, 291, 292, 317.6; 340/323 R; 463/2, 3, 7, 9, 42, 43; 700/90, 91, 92, 93; 702/179, 181, 182, 183

(56) References Cited

U.S. PATENT DOCUMENTS 4,868,772 A * 9/1989 Collard ........................ 700/91
4,890,229 A * 12/1989 Rudnick ...................... 700/91
4,977,503 A * 12/1990 Rudnick et al. .............. 700/91
5,153,826 A * 10/1992 Johnson ....................... 700/91
6,616,529 B1 * 9/2003 Qian et al. ..................... 463/3

OTHER PUBLICATIONS

"Diamond Mind Baseball Software Information Sheet"; Diamond Mind Company; Nov. 25, 2001.*
"TurboStats for Baseball/Softball 9.0"; TurboStats Software Company; Oct. 24, 2001.*
Woolner, Keith, "Statistics Glossary".*
Support–Neutral Statistics–A Method of Evaluating the True Quality of a Pitcher's Start, Michael Wolverton, BTN Article; http://www.baseballprospectus.com/statistics/snwl/snwlart/; Aug. 14, 2001.

* cited by examiner

*Primary Examiner*—John Barlow
*Assistant Examiner*—Douglas N Washburn
(74) *Attorney, Agent, or Firm*—Ronald J. Campbell

(57) ABSTRACT

Methods, systems and devices are provided for measuring a baseball player's accumulated winning contribution (AWC) by determining how much a baseball team's probability of winning changes based on a team member's direct contributions to the outcome of individual events in one or more baseball games.

12 Claims, 2 Drawing Sheets

| Inning | <-3 | -3 | -2 | -1 | 0 | 1 | 2 | 3 | >3 |
|---|---|---|---|---|---|---|---|---|---|
| Initial | *** | *** | *** | *** | P-0 | *** | *** | *** | *** |
| mid 1st | P1M-4 | P1M-3 | P1M-2 | P1M-1 | P1M-0 | *** | *** | *** | *** |
| end 1st | P1E-4 | P1E-3 | P1E-2 | P1E-1 | P1E-0 | P1E+1 | P1E+2 | P1E+3 | P1E+4 |
| mid 2nd | P2M-4 | P2M-3 | P2M-2 | P2M-1 | P2M-0 | P2M+1 | P2M+2 | P2M+3 | P2M+4 |
| end 2nd | P2E-4 | P2E-3 | P2E-2 | P2E-1 | P2E-0 | P2E+1 | P2E+2 | P2E+3 | P2E+4 |
| mid 3rd | P3M-4 | P3M-3 | P3M-2 | P3M-1 | P3M-0 | P3M+1 | P3M+2 | P3M+3 | P3M+4 |
| end 3rd | P3E-4 | P3E-3 | P3E-2 | P3E-1 | P3E-0 | P3E+1 | P3E+2 | P3E+3 | P3E+4 |
| mid 4th | P4M-4 | P4M-3 | P4M-2 | P4M-1 | P4M-0 | P4M+1 | P4M+2 | P4M+3 | P4M+4 |
| end 4th | P4E-4 | P4E-3 | P4E-2 | P4E-1 | P4E-0 | P4E+1 | P4E+2 | P4E+3 | P4E+4 |
| mid 5th | P5M-4 | P5M-3 | P5M-2 | P5M-1 | P5M-0 | P5M+1 | P5M+2 | P5M+3 | P5M+4 |
| end 5th | P5E-4 | P5E-3 | P5E-2 | P5E-1 | P5E-0 | P5E+1 | P5E+2 | P5E+3 | P5E+4 |
| mid 6th | P6M-4 | P6M-3 | P6M-2 | P6M-1 | P6M-0 | P6M+1 | P6M+2 | P6M+3 | P6M+4 |
| end 6th | P6E-4 | P6E-3 | P6E-2 | P6E-1 | P6E-0 | P6E+1 | P6E+2 | P6E+3 | P6E+4 |
| mid 7th | P7M-4 | P7M-3 | P7M-2 | P7M-1 | P7M-0 | P7M+1 | P7M+2 | P7M+3 | P7M+4 |
| end 7th | P7E-4 | P7E-3 | P7E-2 | P7E-1 | P7E-0 | P7E+1 | P7E+2 | P7E+3 | P7E+4 |
| mid 8th | P8M-4 | P8M-3 | P8M-2 | P8M-1 | P8M-0 | P8M+1 | P8M+2 | P8M+3 | P8M+4 |
| end 8th | P8E-4 | P8E-3 | P8E-2 | P8E-1 | P8E-0 | P8E+1 | P8E+2 | P8E+3 | P8E+4 |
| mid 9th | P9M-4 | P9M-3 | P9M-2 | P9M-1 | P9M-0 | P9M+1 | P9M+2 | P9M+3 | P9M+4 |
| end 9th | 0 | 0 | 0 | 0 | P9E-0 | 1 | 1 | 1 | 1 |
| mid 10th | P10M-4 | P10M-3 | P10M-2 | P10M-1 | P10M-0 | *** | *** | *** | *** |
| end 10th | 0 | 0 | 0 | 0 | P10E-0 | 1 | 1 | 1 | 1 |

Figure 1. Home Team Probability of Winning

| Inning | <-3 | -3 | -2 | -1 | 0 | 1 | 2 | 3 | >3 |
|---|---|---|---|---|---|---|---|---|---|
| Initial | *** | *** | *** | *** | P-0 | *** | *** | *** | *** |
| mid 1st | P1M-4 | P1M-3 | P1M-2 | P1M-1 | P1M-0 | *** | *** | *** | *** |
| end 1st | P1E-4 | P1E-3 | P1E-2 | P1E-1 | P1E-0 | P1E+1 | P1E+2 | P1E+3 | P1E+4 |
| mid 2nd | P2M-4 | P2M-3 | P2M-2 | P2M-1 | P2M-0 | P2M+1 | P2M+2 | P2M+3 | P2M+4 |
| end 2nd | P2E-4 | P2E-3 | P2E-2 | P2E-1 | P2E-0 | P2E+1 | P2E+2 | P2E+3 | P2E+4 |
| mid 3rd | P3M-4 | P3M-3 | P3M-2 | P3M-1 | P3M-0 | P3M+1 | P3M+2 | P3M+3 | P3M+4 |
| end 3rd | P3E-4 | P3E-3 | P3E-2 | P3E-1 | P3E-0 | P3E+1 | P3E+2 | P3E+3 | P3E+4 |
| mid 4th | P4M-4 | P4M-3 | P4M-2 | P4M-1 | P4M-0 | P4M+1 | P4M+2 | P4M+3 | P4M+4 |
| end 4th | P4E-4 | P4E-3 | P4E-2 | P4E-1 | P4E-0 | P4E+1 | P4E+2 | P4E+3 | P4E+4 |
| mid 5th | P5M-4 | P5M-3 | P5M-2 | P5M-1 | P5M-0 | P5M+1 | P5M+2 | P5M+3 | P5M+4 |
| end 5th | P5E-4 | P5E-3 | P5E-2 | P5E-1 | P5E-0 | P5E+1 | P5E+2 | P5E+3 | P5E+4 |
| mid 6th | P6M-4 | P6M-3 | P6M-2 | P6M-1 | P6M-0 | P6M+1 | P6M+2 | P6M+3 | P6M+4 |
| end 6th | P6E-4 | P6E-3 | P6E-2 | P6E-1 | P6E-0 | P6E+1 | P6E+2 | P6E+3 | P6E+4 |
| mid 7th | P7M-4 | P7M-3 | P7M-2 | P7M-1 | P7M-0 | P7M+1 | P7M+2 | P7M+3 | P7M+4 |
| end 7th | P7E-4 | P7E-3 | P7E-2 | P7E-1 | P7E-0 | P7E+1 | P7E+2 | P7E+3 | P7E+4 |
| mid 8th | P8M-4 | P8M-3 | P8M-2 | P8M-1 | P8M-0 | P8M+1 | P8M+2 | P8M+3 | P8M+4 |
| end 8th | P8E-4 | P8E-3 | P8E-2 | P8E-1 | P8E-0 | P8E+1 | P8E+2 | P8E+3 | P8E+4 |
| mid 9th | P9M-4 | P9M-3 | P9M-2 | P9M-1 | P9M-0 | P9M+1 | P9M+2 | P9M+3 | P9M+4 |
| end 9th | 0 | 0 | 0 | 0 | P9E-0 | 1 | 1 | 1 | 1 |
| mid 10th | P10M-4 | P10M-3 | P10M-2 | P10M-1 | P10M-0 | *** | *** | *** | *** |
| end 10th | 0 | 0 | 0 | 0 | P10E-0 | 1 | 1 | 1 | 1 |

Figure 2. Probability of scoring N runs based on bases occupied and number of outs

| | | | | | | | | | |
|---|---|---|---|---|---|---|---|---|---|
| Bases occupied: | | | | | | | | | |
| 1st | | NO | YES | NO | NO | YES | YES | NO | YES |
| 2nd | | NO | NO | YES | NO | YES | NO | YES | YES |
| 3rd | | NO | NO | NO | YES | NO | YES | YES | YES |
| Prob. of scoring: | | | | | | | | | |
| 0 runs | none out | P-0-0-0 | P-0-0-1 | P-0-0-2 | P-0-0-3 | P-0-0-12 | P-0-0-13 | P-0-0-23 | P-0-0-123 |
| | one out | P-0-1-0 | P-0-1-1 | P-0-1-2 | P-0-1-3 | P-0-1-12 | P-0-1-13 | P-0-1-23 | P-0-1-123 |
| | two out | P-0-2-0 | P-0-2-1 | P-0-2-2 | P-0-2-3 | P-0-2-12 | P-0-2-13 | P-0-2-23 | P-0-2-123 |
| 1 run | none out | P-1-0-0 | P-1-0-1 | P-1-0-2 | P-1-0-3 | P-1-0-12 | P-1-0-13 | P-1-0-23 | P-1-0-123 |
| | one out | P-1-1-0 | P-1-1-1 | P-1-1-2 | P-1-1-3 | P-1-1-12 | P-1-1-13 | P-1-1-23 | P-1-1-123 |
| | two out | P-1-2-0 | P-1-2-1 | P-1-2-2 | P-1-2-3 | P-1-2-12 | P-1-2-13 | P-1-2-23 | P-1-2-123 |
| 2 runs | none out | P-2-0-0 | P-2-0-1 | P-2-0-2 | P-2-0-3 | P-2-0-12 | P-2-0-13 | P-2-0-23 | P-2-0-123 |
| | one out | P-2-1-0 | P-2-1-1 | P-2-1-2 | P-2-1-3 | P-2-1-12 | P-2-1-13 | P-2-1-23 | P-2-1-123 |
| | two out | P-2-2-0 | P-2-2-1 | P-2-2-2 | P-2-2-3 | P-2-2-12 | P-2-2-13 | P-2-2-23 | P-2-2-123 |
| 3 runs | none out | P-3-0-0 | P-3-0-1 | P-3-0-2 | P-3-0-3 | P-3-0-12 | P-3-0-13 | P-3-0-23 | P-3-0-123 |
| | one out | P-3-1-0 | P-3-1-1 | P-3-1-2 | P-3-1-3 | P-3-1-12 | P-3-1-13 | P-3-1-23 | P-3-1-123 |
| | two out | P-3-2-0 | P-3-2-1 | P-3-2-2 | P-3-2-3 | P-3-2-12 | P-3-2-13 | P-3-2-23 | P-3-2-123 |
| >3 runs | none out | P-4-0-0 | P-4-0-1 | P-4-0-2 | P-4-0-3 | P-4-0-12 | P-4-0-13 | P-4-0-23 | P-4-0-123 |
| | one out | P-4-1-0 | P-4-1-1 | P-4-1-2 | P-4-1-3 | P-4-1-12 | P-4-1-13 | P-4-1-23 | P-4-1-123 |
| | two out | P-4-2-0 | P-4-2-1 | P-4-2-2 | P-4-2-3 | P-4-2-12 | P-4-2-13 | P-4-2-23 | P-4-2-123 |

MEASURING A BASEBALL PLAYER'S ACCUMULATED WINNING CONTRIBUTION

FIELD OF THE INVENTION

The present invention is directed to a methods, systems and devices for determining a baseball player's direct contributions to increasing or decreasing the chances of winning baseball games.

BACKGROUND OF THE INVENTION

Of all the major professional sports, baseball is uniquely suited to using statistical analysis methods to quantitatively evaluate and compare a player's individual contribution to winning or losing a baseball game. This is due to the fact that a baseball game can be broken down into single discrete events typically involving only two players at one time, for example, the batter and the pitcher. The outcome of each of these discrete events can be measured in terms of certain well established conventional statistics, for example, at-bats, hits, runs, runs-batted-in (RBI's), home runs, etc. for a hitter and innings pitched, wins, losses, walks, strike-outs, hits, etc. by a pitcher. Such conventional statistics have the advantage of being based on recording and accumulating data from easily identifiable discrete events. As a result, there is a long history of recording such conventional statistics so that a player's performance can be measured throughout a season or over an entire career. Such conventional statistics can then, in principle, be compared with any hitter or pitcher who has ever played the game.

Such comparisons are inevitably confounded with numerous hidden variables and uncertainties that cloud the conclusions that can be drawn based on such conventional statistics. For example, significant variations in a player's statistics can vary from year-to-year or decade-to-decade due solely to differences in the playing conditions. Well known examples include a change in the height of the pitcher's mound, the "juiced" baseballs that suddenly allow home runs to fly out of the park, an out-blowing wind at Wrigley Field, the Green Monster in Fenway, or the high altitudes that can be a statistical disaster for a home town pitcher in of Colorado, who plays about half his games in a hitter's paradise.

In addition, and perhaps more importantly, many of the conventional statistics can be substantially distorted by events over which the player has no control. This may be particularly true for pitchers. For example, a mediocre starting pitcher may spend years with a team that has a stellar bullpen, or that has a single ace reliever who is the envy of the rest of the league. In such cases, whenever that starting pitcher happens to leave the game with a one or two run lead after the $7^{th}$ or $8^{th}$ innings, nearly 100% of those small leads may be recorded as a "win" for that pitcher. In contrast, an All-Star starter may be stuck for years with a bullpen that is a virtual disaster, for which nearly all of his small leads late inning leads melt into "no-decisions."

On reflection, it is a peculiar anomaly of baseball that a pitcher, who performs solely as a defensive player, is rated so heavily by an outcome, a victory, that includes an equally important offensive component. While the strength of a pitcher's performance may have a large impact on the outcome, it is self evident that a pitcher can never win a game completely on his own based solely on his pitching performance.

Attempts have been made to evaluate a starting pitcher's performance independent of a pitcher's support, either from his team's offense or from his team's relievers, such as the "SNWL" method as described in "Support-Neutral Statistics-A Method of Evaluating the True Quality of a Pitcher's Start, Michael Wolverton, BTN Article, http://www.baseballprospectus.con/statistics/snwl/snwlart/; Aug. 14, 2001, references cited therein. Application of the SNWL method has shown that there can be substantial discrepancies between a pitcher's official Won/Loss (W/L) record and a pitcher's Support-Neutral Won/Loss Record. For example, the 2001 Support-Neutral W/L Report showed that, although Roger Clemens had an official W/L record of 20–3, his Support-Neutral W/L was only 13.8–9.4. This amounted to an SNWL winning "percentage" of only 0.594, which was only $11^{th}$ best in the AL in 2001. The SNWL method, not surprisingly, identified Clemens as the "Luckiest" starter in the Major Leagues in 2001.

Such a striking contrast between the official W/L record and the SNWL record, which seems to be a far more accurate measure of Clemen's 2001 season, did not deter the baseball writers from awarding Clemens his $6^{th}$ Cy Young award. The long-established aura surrounding a 20-game winner, especially one with only 3 official losses, apparently obscured any arguments that might have been mounted in behalf of a more detailed evaluation of Clemen's 2001 record. Nevertheless, such SNWL numbers highlight the need for continuing to strive for more reliable, and more broadly accepted, methods for evaluating a pitcher's performance.

Still another deficiency in the conventional statistics, as well as the SNWL method, is that they do not provide any meaningful comparison between the relative contribution of starting pitchers as compared with so-called everyday position players, or even as compared with relief pitchers. Nor can they quantitatively measure the value of outstanding defensive plays by an acrobatic, cart-wheeling, shortstop or by a weak hitting, but sensational third baseman who almost single-handedly turns a World Series around with his glove rather than his bat. Ironically, rather than detracting from the value of such conventional statistics, such inequities may in a certain perverse way increase their perceived value, merely by exacerbating the endless debates and controversies that have become the beloved folklore of dedicated baseball fans.

One such debate occurs almost annually whenever voting time comes for deciding who should win the MVP award, which by its name would appear to be intended for the "most valuable player". It is a virtual foregone conclusion that a player from a second-rate or last place team will never again win the award for, as one last place owner's famous saying goes, "we could still have come in last without him." Alternatively, there are biased MVP voters who as a matter of principle will not vote for a pitcher, however deserving. For example, even when a pitcher has season stats matching the best of any pitcher over the entire $20^{th}$ century of Major League Baseball, that pitcher may not get listed by certain sportswriters as being even within the top ten of the most valuable players. Such heavily biased voting can have a disproportionate weight on the overall outcome of the voting, in this case, simply because a pitcher is not an "everyday" position player. The simple fact is that, for the one game in four or five that the starting pitcher is on the mound for 100–130 pitches, the outcome of the game usually rests more squarely on his shoulders than on any other player on the field. One would think that such a consideration might tip the balance in his favor when the elusive term "most valuable" is applied to his performance. Though a starting pitcher's appearances are less frequent then everyday position players, his role is far larger per game played.

Such biased voting also does not take into perspective the many games in which the position player may contribute virtually nothing towards producing a victory, or in some cases, may even make a costly error that loses the game. At best, a few of the voting reporters may make an exception and vote for a pitcher as MVP, but only when that pitcher has had a truly spectacular year. Refusal to vote for a pitcher under any circumstances as the most valuable player is perhaps not totally without merit, since there is simply no reliable means now available for measuring the relative contribution of a pitcher as compared with a position player.

The present invention is directed toward developing a statistically-based methods, systems and devices that address these problems.

SUMMARY OF THE INVENTION

The present invention is directed to measuring a baseball player's actual direct contribution to achieving the ultimate goal of every play of a baseball game, which is to help that player's team win that baseball game. Such a method may be used to measure and compare every player's direct contribution in the course of a season or over an overall career, independent of whether that player is a base-stealing, lead-off, singles hitter; a run-producing slugger; an outstanding 8-inning-per-start, starting pitcher; an ace reliever; or "only" the best fielding shortstop or third baseman who ever played the game.

In particular, the present invention is directed to a method of measuring a baseball player's contributions to winning by comparing how much a team's probability of winning increases or decrease based on that player's direct contributions to the outcome of individual events in one or more baseball games. The difference in a team's probability of winning may be compared, for example, before and after each individual event involving that player, with the difference being used as a measure of the contribution, positive or negative, of each player involved in that event. A player's accumulated winning contribution (AWC) may be determined by accumulating all the contributions made by that player during the course of an individual game, and then those contributions may be accumulated over the duration of an entire season or, ultimately, over that player's whole baseball playing career. Such events may include the outcome of a trip to the plate for a hitter, a batter faced by a pitcher, a defensive fielding play by a fielder or a base-running play by a base-runner. Such events may also be measured in terms of a combination of plays, for example, an entire half-inning pitched by a pitcher, where the pitcher's direct contribution is measured in terms of the accumulated difference in that team's probability of winning or losing between the time the pitcher goes to the mound and the time he returns to the dugout. On the other hand, to the extent that such a difference in probability can be statistically measured, the difference may be measured in terms of a single pitch thrown by the pitcher.

One of the benefits of the present invention is that it provides a method, devices and systems for quantifying a baseball player's accumulated contribution to winning baseball games since a player's hitting, fielding, base-running and/or pitching may all be combined into a single combined index, which may be referred to herein as a baseball player's AWC.

More specifically, the present invention is directed to methods, systems and devices that determine a baseball player's contribution to winning baseball games comprising, selecting an event in a baseball game in which a specified baseball player is involved; identifying a pre-event game status that exists immediately prior to the event; determining a pre-event probability for the home team winning the game based on the pre-event game status; identifying a post-event game status that exists immediately after the event; determining a post-event probability for the home team winning the game based on the post-event game status; and assigning a winning contribution to the specified baseball player based on comparing the post-event probability of winning with the pre-event probability of winning.

A particular benefit of the present invention is that it provides a method for evaluating a baseball player's winning contribution independent of whether the player is a hitter, pitcher, fielder or base-runner. Such a benefit provides an objectively quantifiable means of comparing the relative winning contributions of a position player with a starting pitcher.

BRIEF DESCRIPTION OF THE FIGURES

FIG. 1 shows a table of representative statistical probabilities that the home team will win a baseball game based on the difference in score at any given half-inning interval during a baseball game.

FIG. 2 shows a table of representative statistical probabilities that a team will, on average, score N or more runs in an inning based on the number of outs and on all possible bases-occupied situations.

DETAILED DESCRIPTION OF THE INVENTION

The present invention will now be described in detail for specific preferred embodiments of the invention, it being understood that these embodiments are intended only as illustrative examples and the invention is not to be limited thereto.

An embodiment of the present invention may be illustrated by making use of the representative probabilities shown in FIGS. 1 and 2. FIG. 1 shows the probability PH that the home team will win a baseball game based on the difference in score at any given half-inning interval during a baseball game, where PH=PxMy, where x refers to the inning, M indicates the middle of an inning and E indicates the end of an inning, and y indicates the difference in score. A negative value for y corresponds to a lead for the visiting team and a positive value for y corresponds to a lead for the home team. Thus, the notation P1M-0 refers to the probability of the home team winning if the score is still tied in the middle of the first inning. The notation P1M-1, P1M-2, P1M-3, P1M-4, refers to the probability of the home team winning, if the home team is trailing by one run, two runs, three runs, or more than three runs, respectively, in the middle of the first inning. This table would preferably be expanded to include leads of greater than three runs, rather than grouping all the leads of greater than three runs into a single category. Such an expanded table might include all leads that provide statistically significant values.

In addition, Table 1 may be extended to include additional extra innings, if necessary. However, it may be reasonably presumed that every extra inning would have substantially the same values, unless the position in the line-up is included in the game status factors for calculating the winning probability.

The probability PV that the visiting team will win the baseball game at any given instant is given, of course, simply by PV=1−PH.

FIG. 2 shows the probability that a team will score N or more runs in an inning based on the number of outs and all possible bases-occupied situations that can occur at any given instant, that is, no base-runners, only a single base-runner on $1^{st}$, $2^{nd}$ or $3^{rd}$, base-runners on $1^{st}$ and $2^{nd}$, $1^{st}$ and $3^{rd}$, or $2^{nd}$ and $3^{rd}$; and the bases loaded. In this case, the notation P-a-b-c refers to the statistical probability that "a" runs will be scored from that point in the inning until the end of that half-inning, where at that instant there are "b" outs and the bases-occupied status is characterized by "c". Thus, if "c"=0, there are no base-runners, if"c"=1, 2 or 3, there is only a single base-runner on first, second or third, respectively; if"c"=12, 13 or 23, there are base-runners on first and second, first and third, or second and third, respectively; and if"c"=123, the bases are loaded. Those are the only eight possibilities that can exist at any given instant. Since there may be none out, one out or two outs, for a total of three different out situations for each of these eight bases-occupied situations, at any instant in a half-inning there are 24 different possible out/bases-occupied situations. For each of these 24 situations, there is a finite probability of scoring no runs, one run, two runs, etc., or even up to 10 runs or more on relatively rare occasions. For convenience in illustrating the present method, the probability of scoring more than three runs for a specified out/bases-occupied situation is grouped into a single category.

The statistical probabilities that are used for each game status shown in the tables in FIGS. 1 and 2 may be established based on the results of as large a sample of games as are necessary to produce statistically meaningful and internally consistent results. The statistical probability for each value in FIG. 1 would be given by the number of times the home team ultimately won the game divided by the number of times a given run differential had occurred at a given half-inning in the game. Similarly, for the values in FIG. 2, the probability that a specified number of runs would be scored after any given outs/bases-occupied status would be given by (1) the number of times that the specified number of runs had been scored after the given outs/bases-occupied status, divided by, (2) the number of times the given outs/bases-occupied status had occurred for a selected sample of games. If necessary, appropriate statistical techniques may be used to avoid over counting non-independent game status situations.

The values that are used in FIGS. 1 and 2 may be determined by collecting enough data from enough baseball games over a long enough period of time so as to provide statistically significant values for each entry shown in FIGS. 1 and 2. Such data might preferably be collected, for example, for as many years back in time as desired. A comparison of the yearly variation, if any, might then be used to establish standardized "universal" values that remain the same from year to year. Alternatively, due to hidden effects produced by changes in the height of the pitcher's mound, use of livelier baseballs, or dilution of the talent pool by expansion, subtle variations in some of the values shown in FIGS. 1 and 2 may require use of periodically adjusted tables, for example, on a yearly basis. Similarly, if the values in FIG. 2 can be shown to be dependent on the actual score rather than only the difference in score or if the probabilities vary by inning, the tables may be adjusted accordingly, for example, so as to use inning-by-inning values.

In addition, there may be entries in the tables for which insufficient data is available to produce statistically significant values. For example, on those rare or exceedingly infrequent occasions when a team scores 10 runs or more in an inning, those entries may be adjusted as required to produce statistically valid results. The degree to which the values may need to be refined and adjusted to provide a standardized universal table or seasonably adjusted yearly tables might ultimately depend on the degree to which the utility of the present method is proven and recognized over time.

So as to make most effective use of the available data, curve-fitting techniques may be used to develop equations that approximate the probabilities as a function of the many game status factors that may have statistical significance. Such game status factors may typically include the half-inning of the baseball game, the number of outs, the bases-occupied status, the difference in the score, and the baseball park in which the game is being played. Additional factors might be the actual overall score, the order in the line-up that is at-bat, the quality of the teams playing in the game, and/or combinations of each of the above-noted factors. For example, a different set of tables or equations might be developed for each baseball park in which the games are played. Thus, since nearly twice as many runs were scored per game in the 2001 season in Coors Field in Colorado than in Shea Stadium in New York, a 2-run lead in Shea would be of significantly greater value in 2001 than in Coors Field. In fact, there is substantially no limit to all the refinements that may be included, while still remaining within the full scope and spirit of the present invention.

In principle, the data in the look-up tables of FIGS. 1 and 2 could be based on every game played over any desired interval of time and could be based exclusively only on Major League Baseball games, or on as many of the minor leagues as desired. The desired interval of time might cover a single season or portion thereof, an entire decade, or the entire $20^{th}$ century of Major League Baseball, or at least as large a period of time for which adequate data are available.

To determine whether the data are internally consistent, the values obtained for P1M-0, P1M-1, P1M-2, P1M-3, P1M-4, in FIG. 1, for example, would be expected to become progressively and systematically smaller and smaller. However, for sample sizes that are too small, due to natural statistical fluctuations, this might not always be the case. For example, for a relatively small sample, a home team that was trailing by three runs in the middle of the first might erroneously appear to have a greater probability of winning than a team trailing by only two runs in the middle of the first. Similarly, as the game progresses into the later innings, it would be expected that, the later the inning, a small lead would produce a systematically greater probability of winning. So as to obtain statistically valid and internally consistent results, the sample sizes could be increased until such anomalies disappear or, alternatively, such anomalies could be corrected using appropriate well established statistical techniques.

In fact, though it is preferred that the particular sets of probabilities that are used in FIGS. 1 and 2 are reasonably representative of the actual probabilities, the present invention does not depend on requiring that the particular sets of probabilities used in FIGS. 1 and 2 are verifiably representative within a specified accuracy for any given sample of games, however large or small the sample size. As a practical matter, it is expected that reasonable estimates of the probabilities would be adequate to demonstrate the power of the present method for measuring the relative direct winning contributions of each baseball player, independent of whether the probabilities can be verified as precisely correct within a specified accuracy. Furthermore, because of the relative abundance of data that already exists for baseball, it is believed that far more than enough data is already available to apply the present invention meaningfully. In addition, it is believed that as the value of this method is established, standardized tables and equations could be established covering any desired interval of time. One of the intriguing features of the present method is that it might allow interesting trends to be established between each of the Major Leagues, or between the Major Leagues and the Minor Leagues, between different teams, or over different decades.

The purpose for creating these tables can now be illustrated by first recognizing that, at any given instant in a baseball game, there are a relatively large number of distinct game status situations that might occur. In fact, it is relatively straightforward to determine the large but finite number of game status situations that might occur during a baseball game, for example, with respect to the difference in the score, the outs/bases-occupied status, and the half-inning of the game. Thus, for the groupings illustrated in FIGS. 1 and 2, for which the difference in the score is limited to only 9 possibilities, the number of outs/bases-occupied statuses at any instant is 24, and there are 18 half-innings involved, there is a limit of exactly 9×24×18, or 3672 possibilities. If one were to group the run difference into a larger number of possibilities, for example, grouping 10 runs or more into a single category, there would then be 21 different possible differences in the score at any instant. In this case, there would be exactly 21×24×18, or 9072 possibilities.

In principle, for a selected sample of games, the number of times each of these game status situations had ever occurred could be counted, and the number of times that the visiting or home team ultimately won that game could be recorded. A table showing the probability of each team winning the game could then be generated for all these game status situations. Each discrete instant in a baseball game would then have a discrete probability attributed to that specific game status situation. After a specific individual event had occurred, typically a single at-bat, a new out/bases-occupied status would exist, for which a discrete new probability of winning for that successive instant would exist. For each of the players directly involved in that event, typically the pitcher and batter, the difference in these probabilities before and after the event would be credited to these players.

While such a meticulously detailed and cumbersome procedure might ultimately be readily employed using relatively simple computerized techniques, the method may be readily illustrated through the use of tables such as shown in FIGS. 1 and 2. For example, it could be assumed that the probability of scoring "N" runs for any given out/bases-occupied status would be the same in every half-inning, for which it would be sufficient to generate the data for only the discrete entries shown in FIG. 2. In addition, one could then also readily generate the data for FIG. 1, for example, by sampling the line scores of a sufficient number of games.

One of the features of the present invention is that it is intended to be initially based on using data that is already readily available or, at worst, data that can be readily generated. It is believed that such data is readily available for generating the probabilities shown in FIGS. 1 and 2. It is further believed that, as the value of the method becomes established, as noted elsewhere herein, more and more sophisticated techniques might be used to generate data that may not currently be so readily available.

For the representative probabilities shown in FIGS. 1 and 2, that is, (1) the probability of scoring N or more runs based on the outs/bases-occupied status and (2) the probability of winning a baseball game based on the difference in score at any given half-inning interval, these probabilities may be used, in combination, to calculate the probability of either team winning the game at any given instant during a baseball game. For example, at the very beginning of the game, one might refer to the first at-bat as the first event of the game. When the first batter comes to the plate, the "pre-event" probability PHV1 that the home team will win the game would be the sum of:

(1) the probability that the visiting team scores no runs in the first inning, P-0-0-0, as shown in FIG. 2, times the probability P1M-0 that the home team will win the game if the visiting team fails to score any runs in the first; plus (2) the probability that the visiting team scores just one run in the first inning, P-1-0-0, times the probability P1M-1 that the home team will win the game, if the visiting team scores just one run in the first inning; plus (3) the probability that the visiting team scores two runs in the first inning, P-2-0-0, times the probability P1M-2 that the home team will win the game, if the visiting team scores two runs in the first; plus (4) the probability that the visiting team scores three runs in the first inning, P-3-0-0, times the probability P1M-3 that the home team will win the game, if the visiting team scores three runs in the first; plus (5) the probability that the visiting team scores more than three runs in the first inning, P-4-0-0, times the probability P1M-4 that the winning team will win the game, if the visiting team score more than three runs in the first.

$$\text{Thus, } PHV1=[(P\text{-}0\text{-}0\text{-}0)\times(P1M\text{-}0)]+[(P\text{-}1\text{-}0\text{-}0)\times(P1M\text{-}1)]+[(P\text{-}2\text{-}0\text{-}0)\times(P1M\text{-}2)]+[([P\text{-}3\text{-}0\text{-}0)\times(P1M\text{-}3)]+[(P\text{-}4\text{-}0\text{-}0)\times(P1\text{-}M\text{-}4)].$$

Using this type of calculation after each at-bat is completed, a baseball player's winning contribution would be calculated by determining how much the probability of winning changes batter-by-batter, event-by-event, throughout the game. For example, if the lead-off hitter of the game makes an out, the new probability PHV2 for the home team winning the game when the $2^{nd}$ batter comes to the plate, now with one out and still no base-runners, would be the sum of:

(1) the probability that the visiting team still continues to score no runs in the first inning, P-0-1-0, as shown in FIG. 2, times the probability that the home team will win the game if the visitors still fail to score any runs in the first, P1M-0; plus (2) the probability that the visiting team scores just one run in the first inning, P-1-1-0, times the probability P1M-1 that the home team will win the game if the visiting team scores just one run in the first inning; plus (3) the probability that the visiting team scores two runs in the first inning, P-2-1-0, times the probability P1M-2 that the home team will win the game if the visitors score just two runs in the first; plus (4) the probability that the visiting team scores three runs in the first inning, P-3-1-0, times the probability P1M-3 that the home team will win the game if the visitors score three runs in the first; plus (5) the probability that the visiting team scores more than three runs in the first inning, P-4-1-0, times the probability P1M-4 that the home team will win the game, if the visitors score more than three runs in the first.

$$\text{Thus, } PHV2=[(P\text{-}0\text{-}1\text{-}0)\times(P1M\text{-}Y)]+[(P\text{-}1\text{-}1\text{-}0)\times(P1M\text{-}1)]+[(P\text{-}2\text{-}1\text{-}0)\times(P\text{-}1M\text{-}2)]+[(P\text{-}3\text{-}1\text{-}0)\times(P\text{-}1M\text{-}3)]+[(P\text{-}4\text{-}1\text{-}0)\times(P1M\text{-}4)].$$

In this case, PHV2 might be referred to as the "post-event" winning probability for the first batter, and the "pre-event" winning probability for the second batter. Based solely on this single trip to the plate, the winning contribution of the visitor's lead-off batter, CV1, for having made an out, would be based on how much the probability changes. Since the visiting team's probability of winning may reasonably be presumed to decrease as a result of the lead-off hitter making an out, it would be expected that PHV2>PHV1. Thus, since CV1=−[(PHV2)−(PHV1)], the first batter's contribution would be negative. On the other hand, the winning contribution of the home team pitcher, CH1, would be just the opposite, that is, CH1=[(PHV2)−(PHV1)], which, as noted, would presumably be a positive value.

If the second batter of the game then hits a home run, the new probability PHV3 for the home team winning the game, when the 3rd batter for the visiting team comes to the plate, after still only one out and now one run scored, but still no base-runners, would be the sum of:

(1) the probability that the visiting team will score no more runs in the first inning, P-0-1-0, times the probability that the home team will win the game if the visitors fail to score any more runs in the first, P1M-1; plus (2) the probability that the visiting team scores just one more run in the first inning, P-1-1-0, times the probability P1M-2 that the home team will win the game if the visiting team scores just one more run in the first inning; plus (3) the probability that the visiting team scores two more runs in the first inning, P-2-1-0, times the probability P1M-3 that the home team will win the game if the visitors score just two more runs in the first; plus (4) the probability that the visiting team scores three more runs in the first inning, P-3-1-0, times the probability P1M-4 that the home team will win the game if the visitors score just three more runs in the first; plus (5) the probability that the visiting team scores more than four runs in the first inning, P-4-1-0, times the probability P1M-4 that the home team will win the game, if the visitors score more than four runs in the first.

$$\text{Thus, } PHV3=[(P\text{-}0\text{-}1\text{-}0)\times(P\text{-}1M\text{-}1)]+[(P\text{-}1\text{-}1\text{-}0)\times(P\text{-}1M\text{-}2)]+[(P\text{-}2\text{-}1\text{-}0)\times(P1M\text{-}3)]+[(P\text{-}3\text{-}1\text{-}0)\times(P\text{-}1M\text{-}4)]+[(P\text{-}4\text{-}1\text{-}0)\times(P\text{-}1M\text{-}4)].$$

In this case, PHV3 might be referred to as the "post-event" winning probability for the second batter, and the "pre-event" winning probability for the third batter. The winning contribution of the second batter, for having hit a home run, would be CV2=−[(PHV3)−(PHV2)]. Since the visiting team's probability of winning may reasonably be presumed to have increased as a result of the home run, the second batter's contribution CV2 would be positive. Similar to above, the home team pitcher's contribution CH2 would be just the opposite, that is, CH2=[(PHV3)−(PHV2)], which would presumably be a negative value. At this point the pitcher's net contribution, or AWC based on only these two events, may be arithmetically added to provide an AWC of CH1+CH2.

The examples just provided are intended solely for indicating how the change in probability might be determined, without in any way suggesting or implying that other methods might not be employed to accomplish substantially the same objective. For example, rather than relying on the arithmetic difference in the pre-event and post-event probabilities, one might use ratios or percentage changes in the probabilities.

A baseball player's winning contribution as a hitter could then be determined by combining all the individual contributions so as to arrive at a hitter's AWC. Such an index might typically be arrived at by adding the individual contributions so as to calculate a hitter's AWC over the course of a whole baseball season or over an entire career. Such an index might even be described by a set of values for each baseball player, rather than by a single value.

A baseball player's winning contribution as a pitcher would be determined in substantially the same way as for a batter, except that an out would be a positive contribution that would improve the pitcher's AWC and giving up a home run would be a negative contribution that would reduce the pitcher's AWC. Thus, the hitter and pitcher's winning contributions could be treated as a "zero sum" game in which:

Contribution of hitter+Contribution of pitcher=0

However, a particular feature of the present invention is that it need not be limited to measuring the winning contribution solely in terms of the hitter and the pitcher. For example, if there is an error, the hitter could reach base and, thus, increase his team's chances of winning through no positive contribution of his own or through no negative contribution from the pitcher as a pitcher. In this case, similar to the way a hitter's batting average is now calculated as if the hitter made an out, the winning contribution of the hitter and the pitcher would be calculated based on what the outcome would have been had there been no error. In this case, the fielder's fielding play would be included as part of his AWC as a fielder.

Another particular feature of the present invention is that it need not be limited to measuring the winning contribution of a fielder solely in terms of the fielder's negative contribution. For example, a system could be developed which compares a fielder's outstanding defensive plays against what would typically be expected from an average fielder, with the difference, positive or negative, being used as the fielder's winning contribution. For example, rather than giving the pitcher full credit for each out or hit, the credit might be proportioned to the pitcher and every defensive player involved in each play.

Similarly, another particular feature of the present invention is that the method may also be applied to a base-runner's success or failure in stealing a base, with the base-runner's AWC being credited with the difference in the winning probability before and after the steal attempt as his winning contribution. For this case involving the steal attempt, the base-runner's winning contribution could be measured by the change in the winning probability before and after the steal attempt.

For the steal-attempt event, the zero-sum rule might also be applied, but in this case it might be much more problematic to reliably portion out the extent to which the pitcher, catcher or infielder contributed to the success or failure in getting the runner out. Nevertheless, as the method for determining a player's AWC is developed and applied over a period of time, it would in principle be possible and desirable to develop such procedures for assigning the contributions, positive or negative, to the pitcher for his slow delivery, to the catcher for his quick release and accurate throw and/or to the fielder for making the catch and tag.

Such assignments could be made, for example, through the use of as little as the scorer's subjective judgment or by means of much more sophisticated and more objective analyses that rely on using TV replays. In fact, as the value of the present method for determining a baseball player's winning contribution becomes developed and better and better established, it is believed that more and more sophisticated methods and procedures could be used to evaluate substantially every play in a baseball game, even including the probability that a ball will be caught by an average outfielder starting from the instant that the ball leaves the bat.

For a fast base-runner that poses a substantial threat of stealing, techniques might be developed for measuring the base-runner's distraction value. To the extent that such a distraction value might be statistically measured and verified, such distraction contributions might be assigned to the base-runner. In such cases, some or all the credit that is given to the base-runner might be deducted from the batter so as to maintain a zero-sum rule. Thus, a "direct" contribution might be extended to include contributions that would more typically be thought of as indirect contributions. A direct contribution may thus be considered as any contribution that can be shown to have statistical significance.

The present method is based on the fact that any event in a baseball game is susceptible to being isolated and quantifiably measured in terms of whether the outcome significantly increases or decreases a team's chances of winning the game. Such a method provides a tool for quantitatively comparing the relative winning contribution of each player involved in every play of a game, independent of whether that player is a hitter, pitcher, fielder or base-runner. In fact, for those cases where the particular event is based on instructions from the manager for the pitcher to issue an intentional walk or for a batter to attempt a sacrifice bunt, the instruction itself may be identified and treated as an individual event that quantifiably increases or decreases a team's winning probability at that instant. This is distinctly unique to baseball, as compared with basketball, football or ice hockey for which the dynamic interactive flow of the game prevents the individual plays in a game from being conveniently broken down into discrete isolated events. For baseball, even a third base coach's hand-waving signals to a base-runner to try to score on a close play on a throw from the outfield might be treated as an event for which the third base coach is himself assigned an AWC, which may be positive or negative. Evaluation of such dynamic events might require using TV replays and comparing the base-runner's speed and location with the outfielder's throwing arm and the locations of the outfielder and the base-runner at the instant the third base coach gives his signals.

Such an example involving the third base coach is offered to illustrate that there is substantially no limit to the number of events and the level of detail that may be used to determine the AWC of every participant in a baseball game. Whether or not any individual event becomes measured and included in a participant's AWC would ultimately depend on the degree to which that event, and the specific level of detail that may be used, produces objectively verifiable, statistically significant results.

Since it is suspected by the present inventors that the power of such methods and procedures may not be immediately evident to others until the power of the method is verified, a simplified version of the present method may be applied to illustrate the method for determining a pitcher's winning contribution based solely on the values provided in FIG. 1. In the simplest application of the method, the pitcher might be credited with a contribution, positive or negative, based solely on the difference in the probability of winning from the time the pitcher enters the game until he is taken out. For example, if the home team starting pitcher leaves the game for a pinch hitter in the bottom of the $7^{th}$, with his team leading by 1 run, his winning contribution for that game would be determined by the difference in his team's winning probability when he leaves the game to his team's winning probability when the game started. Since that pitcher is now credited with runs his team scores in the bottom of the $7^{th}$, if his teams fail to score any runs in the bottom of the $7^{th}$, his winning contribution, as shown in FIG. 1, would be given by difference between his team's probability of winning with a 1-run lead after 7 innings (P7E+1) and his team's probability of winning at the start of the game (P0).

Alternatively, if his team scores 2 runs in the bottom of the $7^{th}$, his winning contribution would be given by the difference between his team's probability of winning with a 3-run lead after 7 innings (P7E+3) and his team's probability of winning at the start of the game (P-0). Since it is undoubtedly true that a team's probability of winning with a 3-run lead after 7 innings is significantly greater than when the team has only a 1-run lead, the pitcher would be credited with a substantially larger contribution based on events in which he made no contribution, positive or negative.

While this result might be welcomed by the pitcher when it comes time to negotiate a new contract, this method of attributing wins and losses solely to pitchers does not accurately measure the underlying reality of the pitcher's actual winning contribution. Similarly, and more harsh to the pitcher, if the pitcher leaves the game with a 3-run lead after 7 innings, and his team blows the lead, the pitcher currently gets credit for nothing. The net result is that a starting pitcher may receive undeserved statistics, positive or negative, as a result of events over which he has no control.

The SNWL method addresses this un-earned credit problem by assuming the starting pitcher receives average run support for as long as he is in the game or "on the hook". Furthermore, the SNWL method is directed solely toward statistically counting traditionally-defined Wins and Loses, except that the current 5-inning-per-start rule may be suspended.

In contrast, the present method addresses this un-earned credit problem by quantitatively crediting the pitcher with a winning contribution based solely on the extent to which he directly contributes to winning by keeping the other team from scoring too many runs. Such a method does not require making any assumptions about the type of defensive or offensive support that the starting pitcher receives. Furthermore, the present method is based on using statistically-determined probabilities of actually winning the game, not on whether the starting pitcher is credited with a traditionally-defined Win or Loss.

AN EXAMPLE OF THE INVENTION

In particular, such inequities and anomalies may be avoided by crediting the pitcher with a winning contribution based solely on the change in probability each half inning, or part thereof, that the pitcher is on the mound, and accumulating each of these half-inning contributions to arrive at a winning contribution. Thus, the winning contribution of a starting pitcher, who goes out for a pinch-hitter in the bottom of the $7^{th}$, may be illustrated by applying the method to the following inning-by-inning line score:

| Inning | 1 | 2 | 3 | 4 | 5 | 6 | 7 | 8 | 9 | Final |
|---|---|---|---|---|---|---|---|---|---|---|
| Visitors | 0 | 0 | 1 | 0 | 1 | 0 | 2 | 0 | 0 | 4 |
| Home Team | 3 | 0 | 0 | 0 | 0 | 0 | 2 | 0 | x | 5 |

As shown in FIG. 1, the pitcher's net winning contribution for the game would be given by the sum of:

(1) P1M-0 minus P0, for the first inning; plus (2) P2M+3 minus P1E+3, for the second inning; plus (4) P3M+2 minus P2E+3, for the third inning; plus (5) P4M+2 minus P3E+2, for the fourth inning; plus (6) P5M+1 minus P4E+2, for the fifth inning; plus (7) P6M+1 minus P5E+1, for the sixth inning; plus (8) P7M-1 minus P6E+1, for the seventh inning.

Innings 1, 2, 4 and 6 would probably result in relatively small, but quantifiable, positive winning contributions and innings 3, 5 and 7 would probably result in successively larger negative winning contributions. Thus, the pitcher would more than likely end up with a negative contribution even though his teammates pulled out a win in the bottom of the $7^{th}$.

This example illustrates that rather than crediting a pitcher with a complete win or complete loss based on the outcome of events in which the pitcher is not involved, such as is now the case, the pitcher's actual winning contribution may be determined based solely on the actual extent to which the pitcher's individual contribution directly increases or decreases his team's probability of winning. For example, as illustrated in this simplified application of the present method, if the pitcher is on the mound for the entire half-inning, the half-inning may be lumped together as a discrete event, each of the half-innings being combined to determine the AWC for that day's pitching performance. The scoring events that may or may not take place for his team while the pitcher is sitting on the bench do not get included in the AWC, except to the extent that he is required to bat. Unfortunately, even for this improved method of determining the AWC, a method that is intended to include only those events for which the pitcher has made a direct contribution, a pitcher's AWC might still be either positively or negatively altered by fielding or base-running events over which the pitcher has no control. Under these circumstances, the pitcher's AWC might be determined by breaking down the half-inning into a sequence of individual events, batter-by-batter. This would allow the AWC to be determined based solely on events consisting essentially of only those events in which the pitcher made a direct contribution, for example, possibly even being given credit for an out if the batter reached base solely as the result of a fielding error.

Nevertheless, as a practical matter, there may still be certain circumstances where it is difficult to draw a sharp line between a direct contribution and no contribution at all, or at best, only an indefinite indirect contribution. For example, an outfielder could make a spectacular catch reaching over the fence to snatch a home-run ball for the final out with the bases loaded. In this case, the pitcher would receive just as much credit as if the batter struck out. Until more refined means are developed for distributing credit, such inconsistencies would remain. However, once the power of the present method is developed and recognized, it is believed that the method will provide motivation to find appropriate means to distribute the direct contributions more equitably, as well as a substantially more solid base from which to build such comparisons. Thus, to the extent that the direct contributions can be reasonably assigned to the appropriate player, the present method is preferably directed toward determining the AWC based solely on a player's direct contributions.

There are substantially an unlimited number of different types of devices that might be used to exploit the advantages and benefits of the AWC. Thus, once the data for FIGS. 1 and 2 are generated, such data may be stored in centralized databases or websites that are readily accessible over the internet. The data can then be distributed together with the software for allowing each player's AWC to be calculated and continuously up-dated. Alternatively, the AWC may be included as part of the many statistical data that are routinely provided by the various websites and/or sports services. The present invention is further directed to all such devices, systems and methods that incorporate the present method of determining the AWC.

For example, the system may comprise a website for storing an AWC that is accessible over the internet, wherein the AWC is determined by calculating how much a team's probability of winning baseball games is increased or decreased based on a team member's direct contributions to the outcome of individual events in one or more baseball games. Alternatively, the system may comprise a website for storing data that is accessible over the internet, wherein the data may be used to determine an individual player's AWC.

As still another embodiment of the present invention, the system may comprise a website for storing data accessible over the internet, wherein the data may be used to determine the probability of a team winning at a given instant of a baseball game, based on the inning, the difference in the score at that instant and the bases-occupied status at that given instant. For this embodiment, the data may be used for a game in progress. For such cases, the data such as shown in FIGS. 1 and 2 may be refined to include the relative strengths of the specific teams, the batter's position in the batting order, or more to the point, the strength of the batters following him and/or the potential pinch hitters on the bench. Ultimately, even data on the AWC of the individual players directly involved, including the base-runners and the potential following batters, may be used to determine the real-time probability of winning.

For this embodiment, the data may be stored in a computer, lap-top computer, or hand-held PDA (personal digital assistant), each of which may allow one to instantly access the team's probability of winning in real time. Such computers or PDA's may be periodically up-dated using the most current data. For this embodiment, the data may comprise simple look-up tables such as illustrated by FIGS. 1 and 2, or their corresponding equations. This embodiment is based on recognizing that once such data are generated, other practical applications may be found, in addition to that of determining a player's AWC. Such data may in fact be stored in the form of a single table having as many as 10,000 entries or more, so as to cover all statistically significant possibilities. In addition, such applications may make use of the AWC of the players directly involved at a given instant in a live baseball game.

The inventors of the present method for determining the AWC believe this method is capable of providing a valuable tool for use as a primary factor in selecting the most, valuable player each year, independent of whether the player is a hitter, pitcher, fielder, base-runner or a combination thereof.

What is claimed is:

1. A method for measuring winning contributions in baseball, comprising:

selecting an event in a baseball game in which a specified baseball player is involved;

identifying a pre-event game status that exists immediately prior to the event;

determining a pre-event probability for the home team winning the game based on the pre-event game status;

identifying a post-event game status that exists immediately after the event;

determining a post-event probability for the home team winning the game based on the post-event game status; and assigning a winning contribution to the specified baseball player based on comparing the post-event probability of winning with the pre-event probability of winning.

2. The method of claim 1 wherein the winning contribution is determined based on the difference between the post-event probability of winning and the pre-event probability of winning.

3. The method of claim 1 wherein an accumulated winning contribution is determined for the specified baseball player by accumulating the winning contributions of the specified baseball player from a plurality of events in one or more baseball games.

4. The method of claim 1 wherein the pre-event status and the post-event status are each based on factors selected from the group consisting of the half-inning of the baseball game, the number of outs, the bases-occupied status, the difference in the score, the actual overall score, the baseball park in which the game is being played, the order in the line-up that is at-bat, the quality of the teams playing in the game, and combinations thereof.

5. The method of claim 2 wherein the plurality of events consist essentially of events in which the specified baseball player is directly involved.

6. A system for providing the winning contributions of all participants on a baseball team, comprising a device that provides a specified baseball player's accumulated winning contribution, wherein the specified baseball player's contribution to winning baseball games is determined by:

selecting an event in a baseball game in which the specified baseball player is involved;

identifying a pre-event game status that exists immediately prior to the event;

determining a pre-event probability for the home team winning the game based on the pre-event game status;

identifying a post-event game status that exists immediately after the event;

determining a post-event probability for the home team winning the game based on the post-event game status;

assigning a winning contribution to the specified baseball player based on comparing the post-event probability of winning with the pre-event probability of winning; and accumulating the winning contributions from a plurality of events in one or more baseball games to determine the specified baseball player's accumulated winning contribution.

7. The system of claim 6 wherein the device is a computer.

8. The system of claim 6 wherein the device is a lap-top computer.

9. The system of claim 7 wherein the computer is a hand-held computer.

10. The system of claim 6 wherein the device is a PDA.

11. The device of claim 6 wherein the device is an internet website.

12. The device of claim 6 wherein the device is a published book.

* * * * *